June 30, 1964  S. EFEIAN  3,139,094
TOOTHBRUSH KIT
Filed Feb. 12, 1962  3 Sheets-Sheet 1
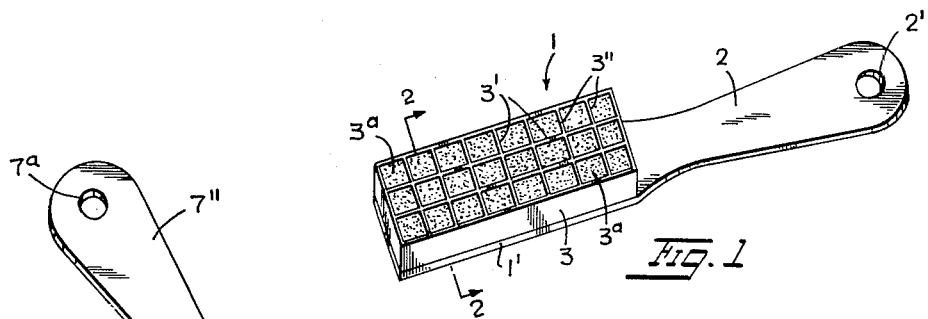
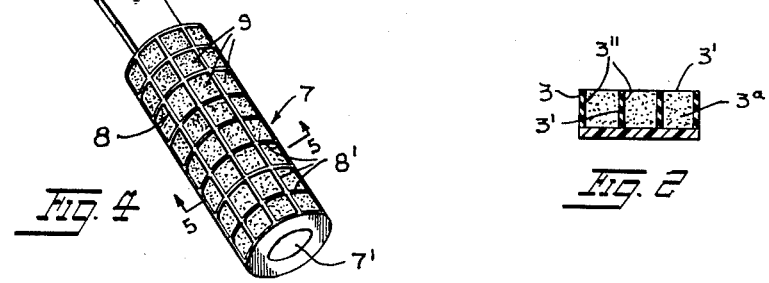
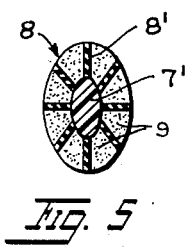
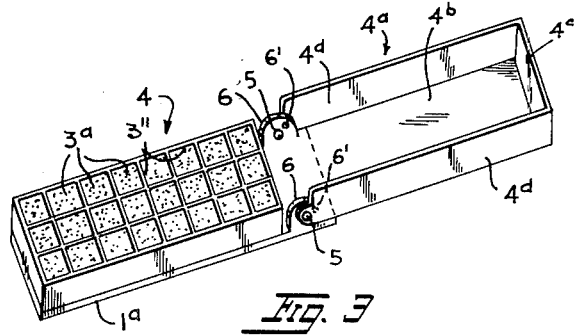
INVENTOR.
SOUREN EFEIAN
BY
ATTORNEY June 30, 1964 S. EFEIAN 3,139,094
TOOTHBRUSH KIT
Filed Feb. 12, 1962 3 Sheets-Sheet 2
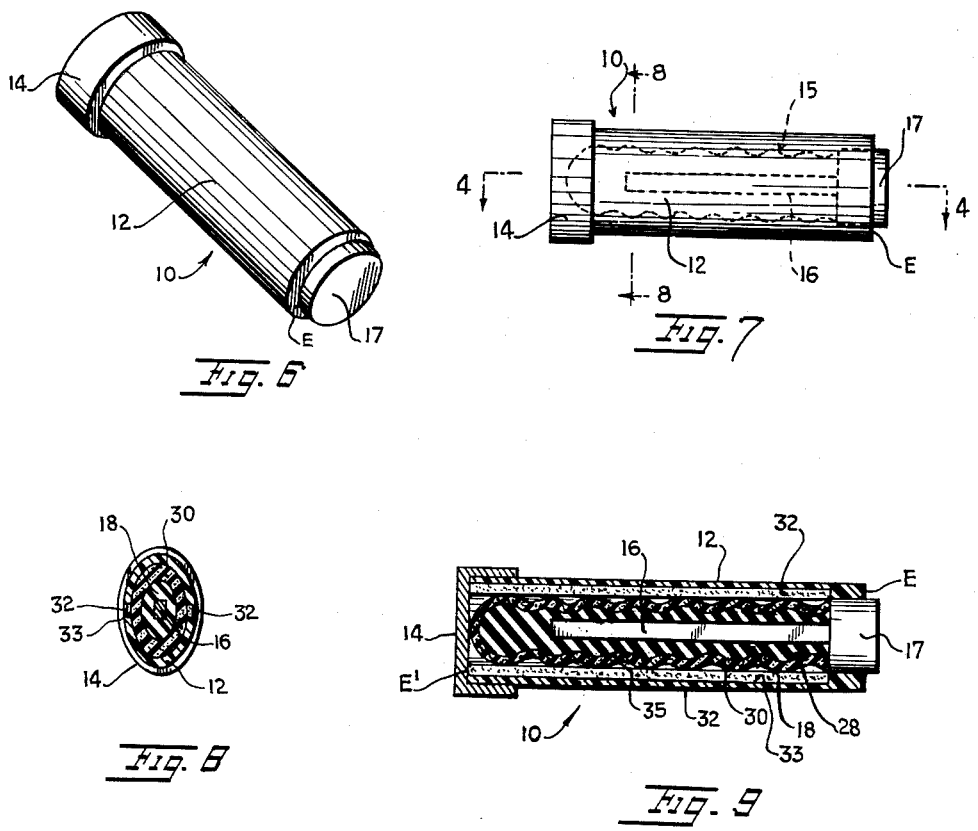
INVENTOR.
SOUREN EFEIAN
BY
ATTORNEY June 30, 1964  S. EFEIAN  3,139,094
TOOTHBRUSH KIT
Filed Feb. 12, 1962
3 Sheets-Sheet 3
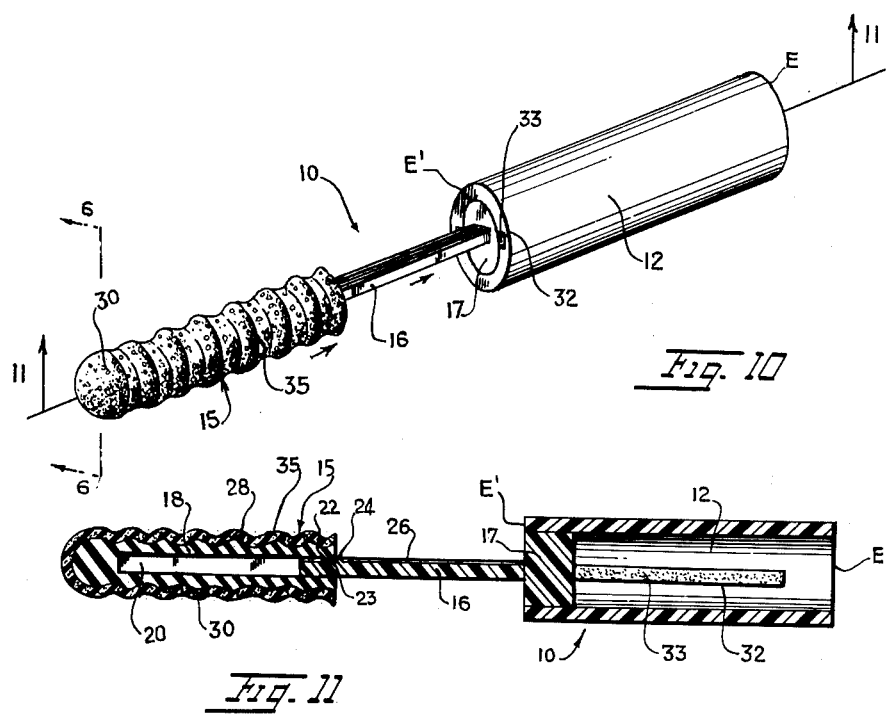
Fig. 10
Fig. 11
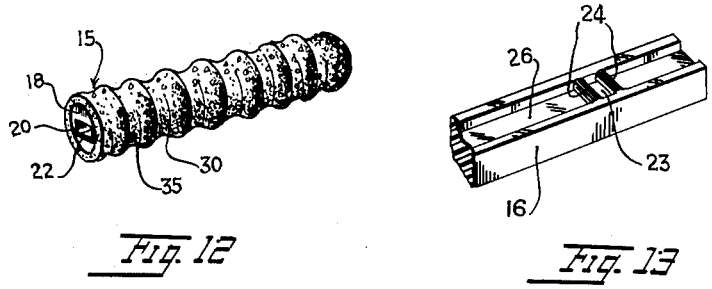
Fig. 12
Fig. 13
INVENTOR.
SOUREN EFEIAN
BY
ATTORNEY

United States Patent Office 3,139,094
Patented June 30, 1964

3,139,094
TOOTHBRUSH KIT
Souren Efeian, 225 E. 17th St., New York, N.Y.
Filed Feb. 12, 1962, Ser. No. 173,323
4 Claims. (Cl. 132—84)

This invention relates to the art of dental appliances and more particularly to an improved device for cleaning teeth and massaging gums.

According to one form of my invention, there is provided a tooth cleaning and gum massaging rubber brush chemically treated and having a rigid plastic handle.

In accordance with another form of the invention, a tooth cleaning and gum massaging device or brush is provided with a chemically treated pad and with a hinged handle adapted to serve as a cover for the pad in inoperative position.

According to still another form of the invention there is provided a device or appliance having a hollow flexible plastic casing with a removable head which can be telescopically received and protected within the casing. The head of the device includes a rather stiffly flexible rubber core on which is mounted a porous spongy cover. The core and cover are corrugated. The cover may be impregnated with a liquid dentifrice which will be active without require wetting with water. Alternatively, the cover can be impregnated with a paste dentifrice which dissolves when the head of the device is immersed in water. In a preferred form of the invention, the hollow casing is provided with grooves which can be filled with a paste dentrifrice. When the head is retracted inside the casing and the casing is squeezed, the dentifrice can be discharged upon the spongy head of the appliance. The removable head can be discarded after being used once or a number of times and a new head can be mounted in the device. The casing may serve as a handle for the device.

It is therefore one object of the invention to provide a dental appliance including a plastic handle and spongy dentifrice applicator.

Another object is to provide a dental appliance including a corrugated spongy head telescopically carried by a hollow flexible plastic casing provided with a supply of dentifrice therein and adapted to serve as a handle.

A further object is to provide an appliance as described wherein the head is removable and replaceable by another.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a top perspective view of a tooth cleaning and gum massaging brush embodying one form of my invention.

FIG. 2 is a cross-sectional view taken on the line 2—2 of FIG. 1.

FIG. 3 is a view similar to FIG. 1 of a tooth cleaning and gum massaging brush embodying another modified form of the invention.

FIG. 4 is a view similar to FIG. 1 of a tooth cleaning and gum massaging brush embodying still another modified form of the invention.

FIG. 5 is a cross-sectional view taken on the line 5—5 of FIG. 4.

FIG. 6 is a perspective view of an appliance embodying the invention, shown in closed position.

FIG. 7 is a side elevational view of the closed appliance.

FIGS. 8 and 9 are sectional views taken on lines 8—8 and 9—9, respectively, of FIG. 7.

FIG. 10 is a lateral perspective view of the appliance in open position.

FIG. 11 is a longitudinal, central sectional view taken on line 11—11 of FIG. 10.

FIG. 12 is a perspective view on an enlarged scale of the head of the appliance per se.

FIG. 13 is a perspective view on an enlarged scale of part of a shaft employed in the appliance.

Referring in detail to the drawings, in FIG. 1 a tooth cleaning and gum massaging device or brush is shown and designated generally by the reference numeral 1. The brush comprises a rectangular-shaped thin plate 1' of plastic and a handle 2 formed integrally with the body. The handle 2 is formed with a hole 2' for hanging the brush on a nail or the like.

A rubber slab or block 3 is placed on top of the plate 1' and secured thereon by adhesive. The slab or block is composed of criss-crossed rubber filaments 3' defining pockets 3" therebetween. Into each pocket is plugged or inserted a chemically treated plug $3^a$. The plug is preferably treated with a detergent such as rubber caoutchouc vulcanized condensation of aldehydes with amines to retard oxidation of vulcanized rubber.

In FIG. 3, a tooth cleaning and gum massaging device or brush embodying a modified form of the invention is shown and designated generally by the reference numeral 4. The brush 4 differs from the brush 1 in that the handle $4^a$ is pivotally secured to the adjacent end of the plate $1^a$ by means of a pivot pin 5. The handle $4^a$ is in the shape of a shallow boxlike body with a bottom wall $4^b$, end wall $4^c$, and side walls $4^d$, $4^d$ and being open at the top and other end. The box is made of the same plastic material as the plate $1^a$. Plate $1^a$ mounts a rubber slab or block $3^a$ similar in construction to the slab or block 3 of the form of FIG. 1. Plate $1^a$ projects beyond the end of the slab or block $3^a$ and mounts side plates 6 providing bearings for the pivot pin 5. The plates 6 are formed with detents 6' coacting with indentations in the side walls $4^d$, $4^d$ of the box handle for holding the handle in extended position.

In FIG. 4 a tooth cleaning and gum massaging device or brush embodying yet another modified form of the invention is shown and designated generally by the reference numeral 7. The brush 7 is formed with an elongated thin plastic body 7', oval in cross section, and an integral handle 7" forming an extension of the body. The handle is formed with a hole $7^a$ for hanging the device on a nail or the like.

Sleeved around the body 7' there is a tubular rubber sleeve 8 formed with spaced radial passages 8' into which is plugged chemically treated plugs 9, the plugs being treated with the same chemical as the chemical used to treat the plugs of the form of FIG. 1.

The brushes of FIGS. 1, 3 and 4 may be used without the chemical but in dry state or may be merely dipped in water and used.

Referring to FIGS. 6 to 13, inclusive of the drawings, there is shown appliance 10 including a hollow, elliptically cylindrical, flexible plastic casing 12 made of vinyl, polyethylene or similar plastic material. The casing 12 is open at both ends E and E' and is elliptical in cross section. One end of the casing 12 may be closed by a removable cap 14 which is also elliptical in cross section. Inside casing 12 is a frictionally fitted elliptical plastic plug 17. The plug is axially slidable in the casing 12 and normally has its free end exposed and projecting axially of the casing when the device 10 is closed as shown in FIGS. 6, 7 and 9. Integral with the plug 17 and extending axially thereof is a shaft 16. The shaft is rigid and made of the same plastic material as the plug. The shaft is rectangular in cross section.

The head 15 of the device includes an elliptically cylindrical stiffly flexible rubber shell or core 18 having an axial bore 20 which is rectangular in cross section. The shaft 16 fits slidably in this bore. Complete disengagement of the shaft and core is normally prevented by a transverse projection 22 at the outer end of bore 20 which engages in a recess 23 defined between two narrow transverse webs 24 formed in a groove 26 at one side of the shaft; see FIG. 13. Due to the flexibility of core 18, the shaft and core can be separated by rather forcibly pulling the shaft and core axially away from each other.

Core 18 is formed with a series of outer corrugations 28. A porous, spongy rubber or plastic tubular cover 30, externally corrugated at 35, is engaged on the core 18. This cover can be initially impregnated with a viscous dentifrice so that the head 15 is ready for use when first extended from the casing without requiring spreading with a toothpaste as in prior dental appliances.

To replenish the dentifrice, there is provided a plurality of grooves 32 in opposing inner walls of the casing 12. These grooves will be filled with paste dentifrice 33. When the head 15 is retracted inside the casing, the flexible casing walls can be squeezed to discharge some of the dentifrice upon the spongy cover 30.

FIGS. 6–9 show the device in retracted closed position. Shaft 16 is axially retracted inside bore 20 and the head 15 is telescoped within the casing 12. Plug 17 projects part way at the end E of casing 12. Cap 14 closes the other end E'. The user can grasp casing 12 and push the plug 17 axially inward of the casing. This will dislodge the cap 14 and extend the free end of the head 15 from the casing end E'. The user can then grasp the free end of head 15 and pull the head axially out of the casing or the user can continue pushing the plug with a finger until the head 15 is entirely exposed. Then by grasping the shaft 16 the complete extension of the shaft can be effected.

If desired, the user can pull the shaft and plug completely out of the casing and use the plug as a handle. But it will generally be preferable to leave the plug seated just inside the casing as shown in FIGS. 7 and 9, and use the casing as a handle. The appliance 10, in extended position shown in FIGS. 10 and 11, can be used for cleaning teeth and gums. The corrugations 35 in the cover 30 backed up by the corrugations 28 on the outer surface of core 18 serve as an effective pad or brush for cleaning teeth, tongue and gums, and as a stimulating massaging device for the gums.

The dentifrice impregnating the cover 30 is replenished when the head 15 is pushed back into the casing in the closed position of FIGS. 6–9. Then the user can squeeze the flexible side walls of casing 12 to discharge the dentifrice 33 upon the spongy cover.

The head 15 is forcibly removable from the shaft 16 as mentioned above and can then be replaced by another head whenever desired. The non-circular structure of the casing, cover, core, plug and shaft prevents relative rotational movements of these parts.

The device described is small in size and can conveniently be carried in purse or pocket in closed position. The several internal parts are kept in a clean and sanitary condition ready for use when the device is closed.

The device can be inexpensively manufactured by mass production rubber and plastic molding machinery. It is attractive in appearance. The corrugated elliptical form of head is particularly useful in entering and cleaning small spaces.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A dental appliance, comprising a hollow, flexible, plastic casing open at opposite ends, a plug frictionally bfitted and slidable in the casing, a shaft carried by the plug and extending axially of the plug and casing, a head slidably carried by the shaft and fittingly received in the casing, said head including a flexible core having a central bore slidably receiving said shaft, a spongy porous cover surrounding said core, said casing having lateral grooves inside opposing flexible walls thereof, and a paste dentifrice in the grooves exposed to said cover when inside the casing for discharging upon said cover when said walls are squeezed inwardly.

2. A dental appliance, comprising a hollow, flexible, plastic casing open at opposite ends, a plug frictionally fitted and slidable in the casing, a shaft carried by the plug and extending axially of the plug and casing, a head slidably carried by the shaft and fittingly received in the casing, said head including a flexible core having a central bore slidably receiving said shaft, a spongy porous cover surrounding said core, said casing having lateral grooves inside opposing flexible walls thereof, and a paste dentifrice in the grooves exposed to said cover when inside the casing for discharging upon said cover when said walls are squeezed inwardly, said bore and shaft having interengaging means holding said shaft in said bore, said means requiring axially directed force to separate the shaft and core.

3. A dental appliance, comprising a hollow, flexible, plastic casing open at opposite ends, a plug frictionally fitted and slidable in the casing, a shaft carried by the plug and extending axially of the plug and casing, a head slidably carried by the shaft and fittingly received in the casing, said head including a flexible core having a central bore slidably receiving said shaft, a spongy porous cover surrounding said core, said casing having lateral grooves inside opposing flexible walls thereof for receiving a dentifrice to be discharged upon the cover when inside the casing, said bore and shaft having interfitting means holding said shaft in said bore, said plug extending part way out of one end of the casing when said shaft and head are retracted inside the casing, and a cap removably disposed on and closing the other end of the casing.

4. A dental appliance, comprising a hollow, flexible, plastic casing open at opposite ends, a plug frictionally fitted and slidable in the casing, a shaft carried by the plug and extending axially of the plug and casing, a head slidably carried by the shaft and fittingly received in the casing, said head including a flexible core having a central bore slidably receiving said shaft, a spongy porous cover surrounding said core, said casing having lateral grooves inside opposing flexible walls thereof, and a paste dentifrice in the grooves exposed to said cover when inside the casing for discharging upon said cover when said walls are squeezed inwardly, said casing, plug, core and cover being elliptical cylindrical and said shaft being rectangular in cross section to prevent relative rotational movement of the casing, plug, core, cover and shaft.

References Cited in the file of this patent

UNITED STATES PATENTS

| Number | Name | Date |
|---|---|---|
| 1,682,325 | D'Amico et al. | Aug. 28, 1928 |
| 2,165,420 | Seifert | July 11, 1939 |
| 2,175,487 | Stall | Oct. 10, 1939 |
| 2,217,439 | Fuller | Oct. 8, 1940 |
| 2,426,288 | Wagner | Aug. 26, 1947 |
| 2,517,912 | Nathan | Aug. 8, 1950 |
| 2,576,550 | Waters | Nov. 27, 1951 |
| 2,710,982 | Gillem | June 21, 1955 |
| 2,893,031 | Dengler | July 7, 1959 |
| 2,893,036 | Filler et al. | July 7, 1959 |
| 3,002,937 | Parker et al. | Oct. 3, 1961 |
| 3,007,441 | Eyer | Nov. 7, 1961 |